United States Patent [19]

Rehrig

[11] Patent Number: 5,111,604

[45] Date of Patent: May 12, 1992

[54] BASKET WALL AND PLACARD DISPLAY ASSEMBLY

[75] Inventor: Houston Rehrig, Richmond, Va. 23226

[73] Assignee: Rehrig International, Inc., Richmond, Va.

[21] Appl. No.: 663,023

[22] Filed: Mar. 1, 1991

Related U.S. Application Data

[60] Division of Ser. No. 636,014, Jan. 4, 1991, which is a continuation of Ser. No. 333,680, Apr. 6, 1989, abandoned, which is a continuation-in-part of Ser. No. 190,065, May 4, 1988, Pat. No. 4,922,639, and a continuation-in-part of Ser. No. 579,052, Sep. 7, 1990, which is a division of Ser. No. 333,680, Apr. 6, 1989, and Ser. No. 533,144, Jun. 6, 1990, which is a continuation-in-part of Ser. No. 333,680, Apr. 6, 1989, and a continuation-in-part of Ser. No. 190,065, May 4, 1988, Pat. No. 4,922,639.

[51] Int. Cl.⁵ .............................. G09F 3/00
[52] U.S. Cl. ............................ 40/308; 280/33.991
[58] Field of Search ................. 40/308, 643; 280/33.991, 33.992

[56] References Cited

U.S. PATENT DOCUMENTS

| | | |
|---|---|---|
| D. 247,953 | 5/1978 | Rehrig . |
| D. 296,259 | 6/1988 | Rehrig . |
| 2,101,965 | 12/1937 | Trees . |
| 2,723,474 | 11/1955 | Minter . |
| 2,797,513 | 7/1957 | Edwards, Jr. . |
| 2,845,729 | 8/1958 | Baumgart . |
| 3,024,554 | 3/1962 | Kempher . |
| 3,088,236 | 5/1963 | Hendrick . |
| 3,287,841 | 11/1966 | Spragg et al. . |
| 3,609,893 | 10/1971 | Routzahn et al. . |
| 3,677,570 | 7/1972 | Hedu . |
| 3,782,747 | 1/1974 | Hamilton, Jr. . |
| 3,999,774 | 12/1976 | Rehrig . |
| 4,024,660 | 5/1977 | Goto . |
| 4,217,711 | 8/1980 | Spresser et al. ............ 40/308 |
| 4,273,346 | 6/1981 | Rehrig . |
| 4,376,502 | 3/1983 | Cohen ..................... 40/308 X |
| 4,413,434 | 11/1983 | Rupert et al. . |
| 4,484,755 | 11/1984 | Houston . |
| 4,555,123 | 11/1985 | Rehrig . |
| 4,616,839 | 10/1986 | Trubiano . |
| 4,650,199 | 3/1987 | Rehrig . |
| 4,765,077 | 8/1988 | Rosenthal et al. ............ 40/308 |
| 4,922,639 | 5/1990 | Rehrig ..................... 40/308 |

FOREIGN PATENT DOCUMENTS

| | | |
|---|---|---|
| 0176168 | 2/1986 | European Pat. Off. . |
| 2408346 | 10/1975 | Fed. Rep. of Germany . |
| 2656921 | 12/1976 | Fed. Rep. of Germany .......... 280/33.991 |
| 3133276 | 3/1983 | Fed. Rep. of Germany . |
| 3340399 | 5/1985 | Fed. Rep. of Germany . |
| 3502791 | 7/1986 | Fed. Rep. of Germany . |
| 088355 | 10/1987 | Fed. Rep. of Germany . |
| 2452142 | 10/1980 | France . |
| 2556117 | 12/1983 | France . |
| 2551012A | 3/1985 | France . |
| 2605130A | 10/1989 | France . |
| 98429 | 11/1980 | Spain . |
| 282478 | 11/1984 | Spain . |
| 284204 | 1/1985 | Spain . |
| 735209 | 8/1955 | United Kingdom . |
| 2217504A | 10/1989 | United Kingdom . |

OTHER PUBLICATIONS

Stratmedia—Twenty—two photographs.

Primary Examiner—Kenneth J. Dorner
Assistant Examiner—James M. Gardner
Attorney, Agent, or Firm—Bacon & Thomas

[57] ABSTRACT

A basket wall and display card assembly including a basket wall having interior and exterior wall faces. A back plate is secured to and integrally formed and molded with the basket wall and generally encircled by the basket wall. The back plate has a front face, a plate perimeter and an upright edge wall around a substantial portion of the plate perimeter and extending out from the front face. The front face is recessed in a distance from the exterior wall face. A display card frame is manufactured as a separate piece from the back plate, and a notch and tab assembly releasably holds the frame relative to the edge wall whereby the frame and the back plate are in a securely held position. This holding assembly allows the frame and the back plate to be completely separable one from the other. When the frame and the back plate are in the held position, a display card display area is defined generally therebetween wherein a replaceable diplay card can be held and viewed generally through the frame.

45 Claims, 19 Drawing Sheets

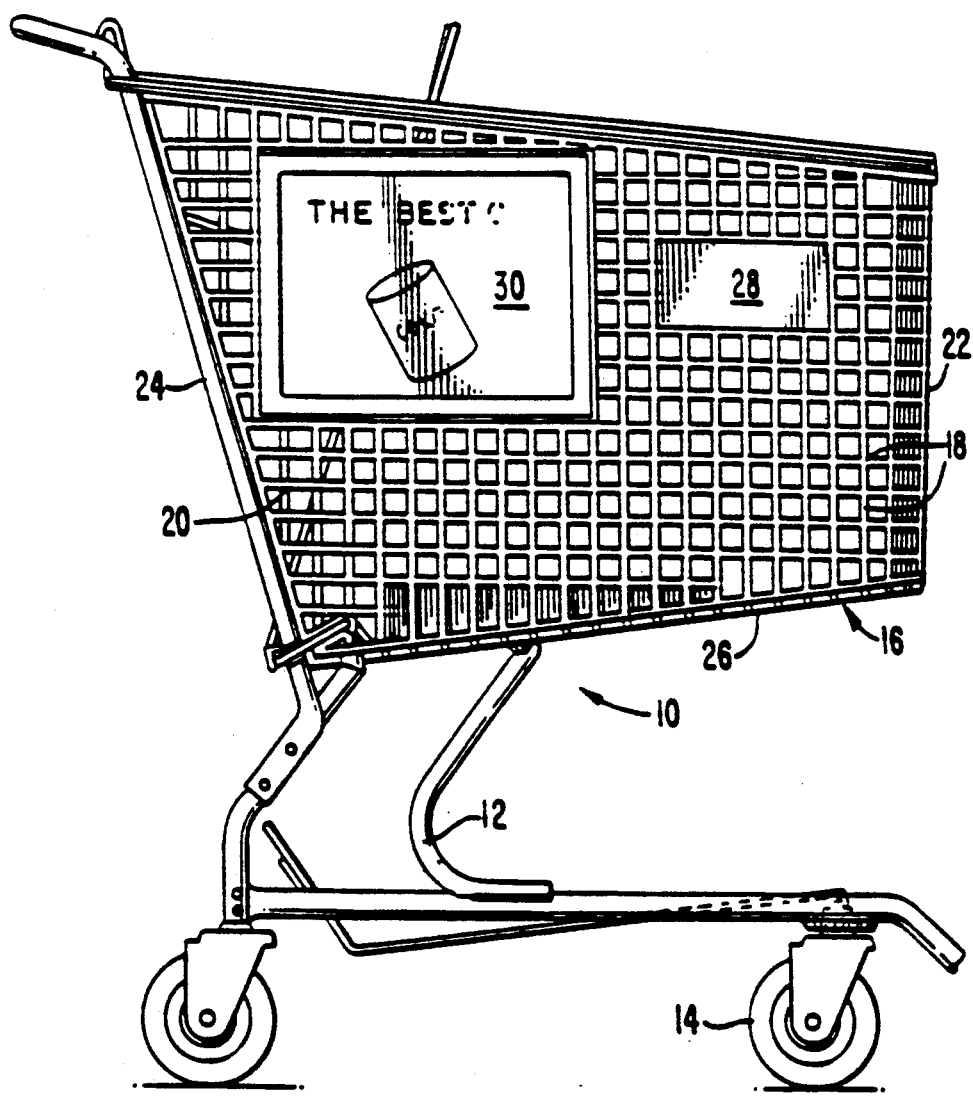

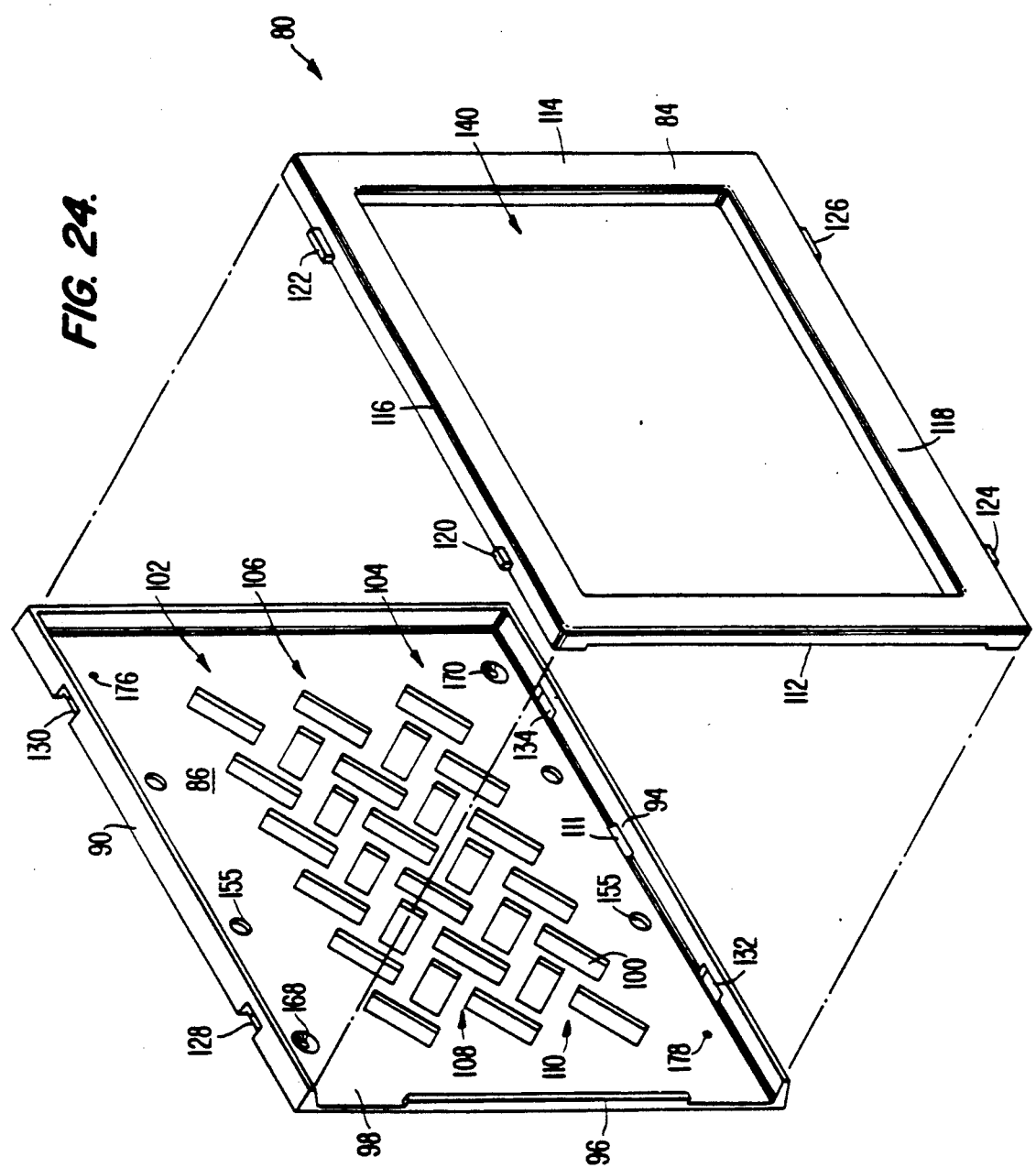

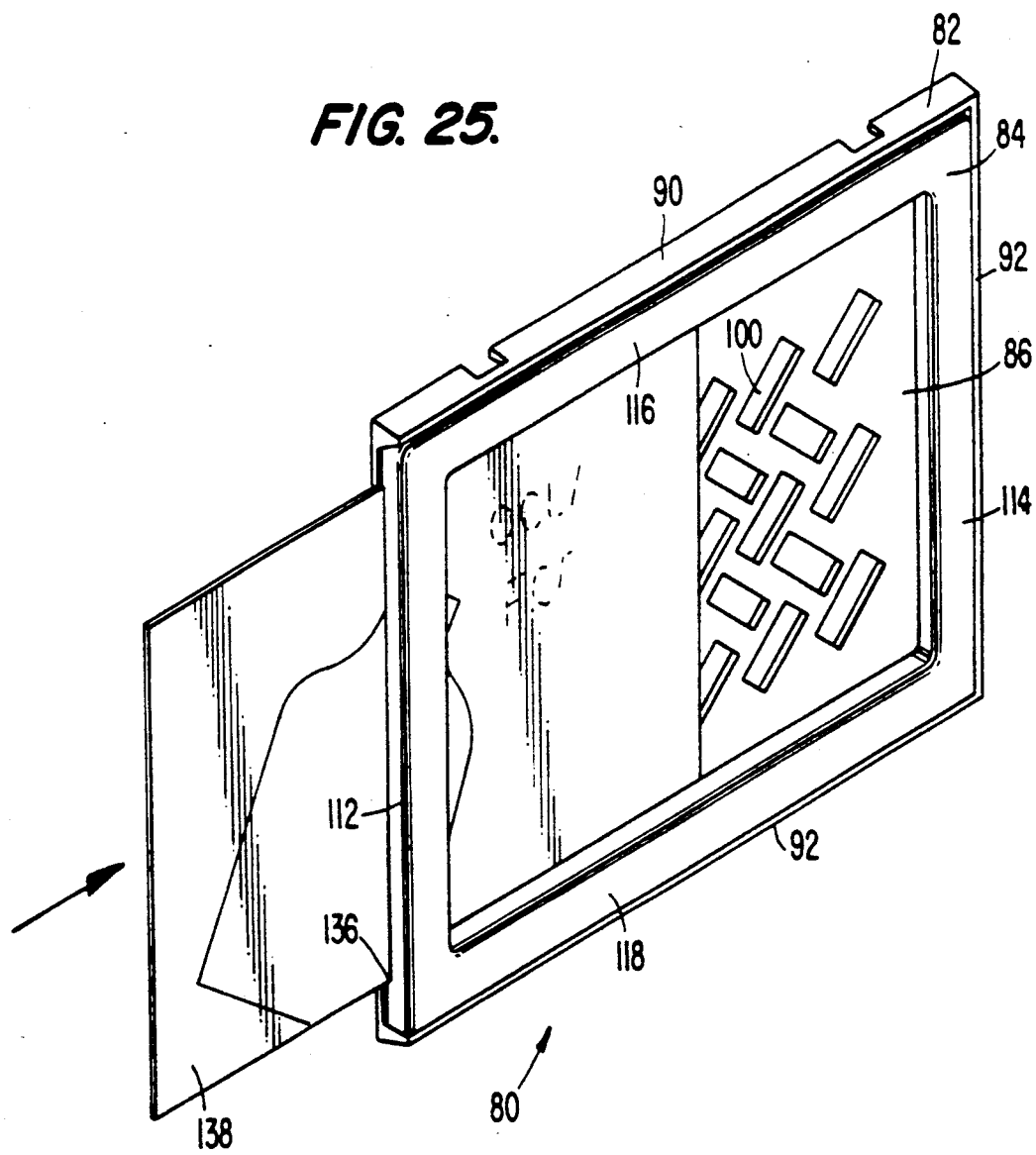

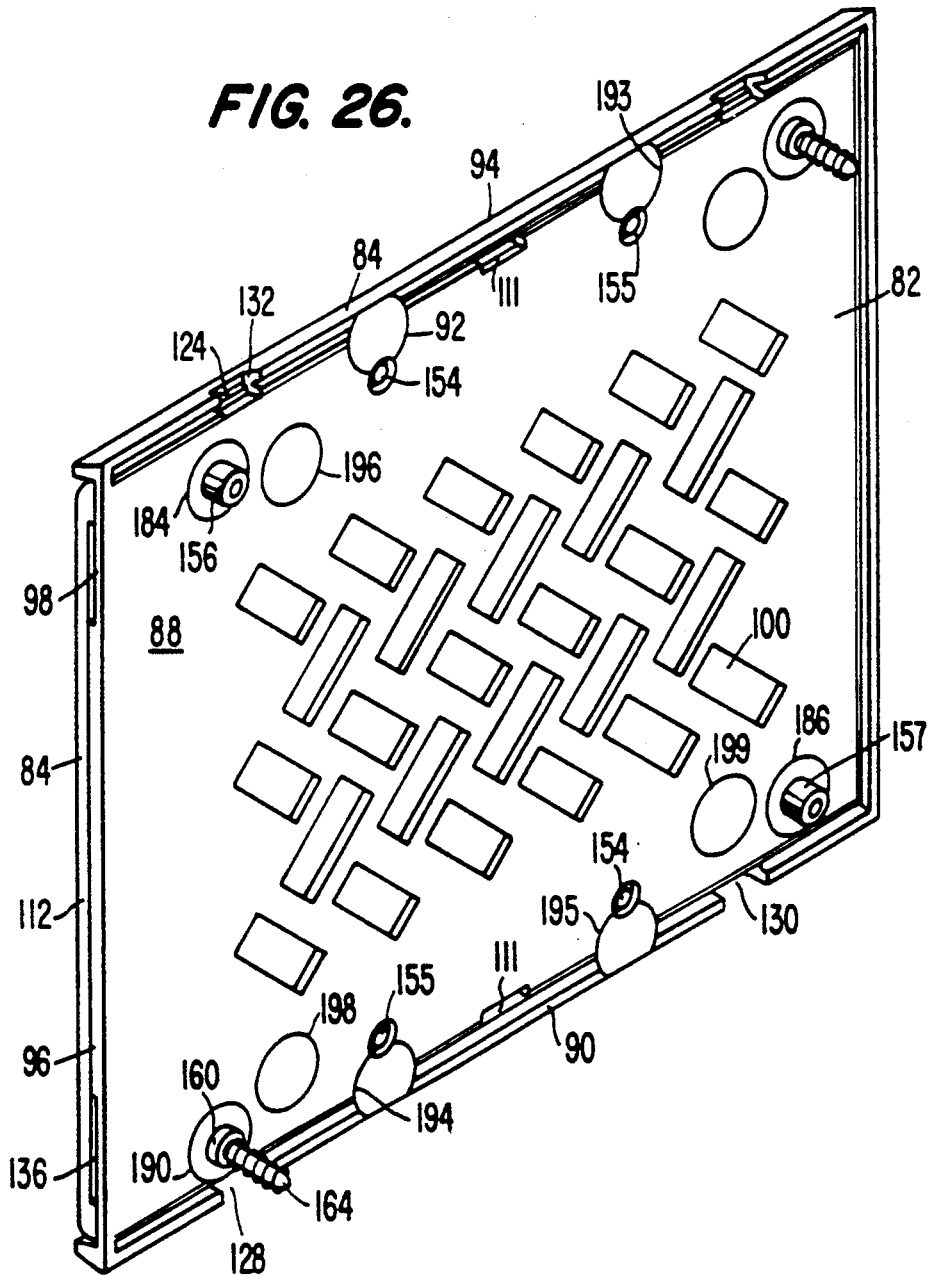

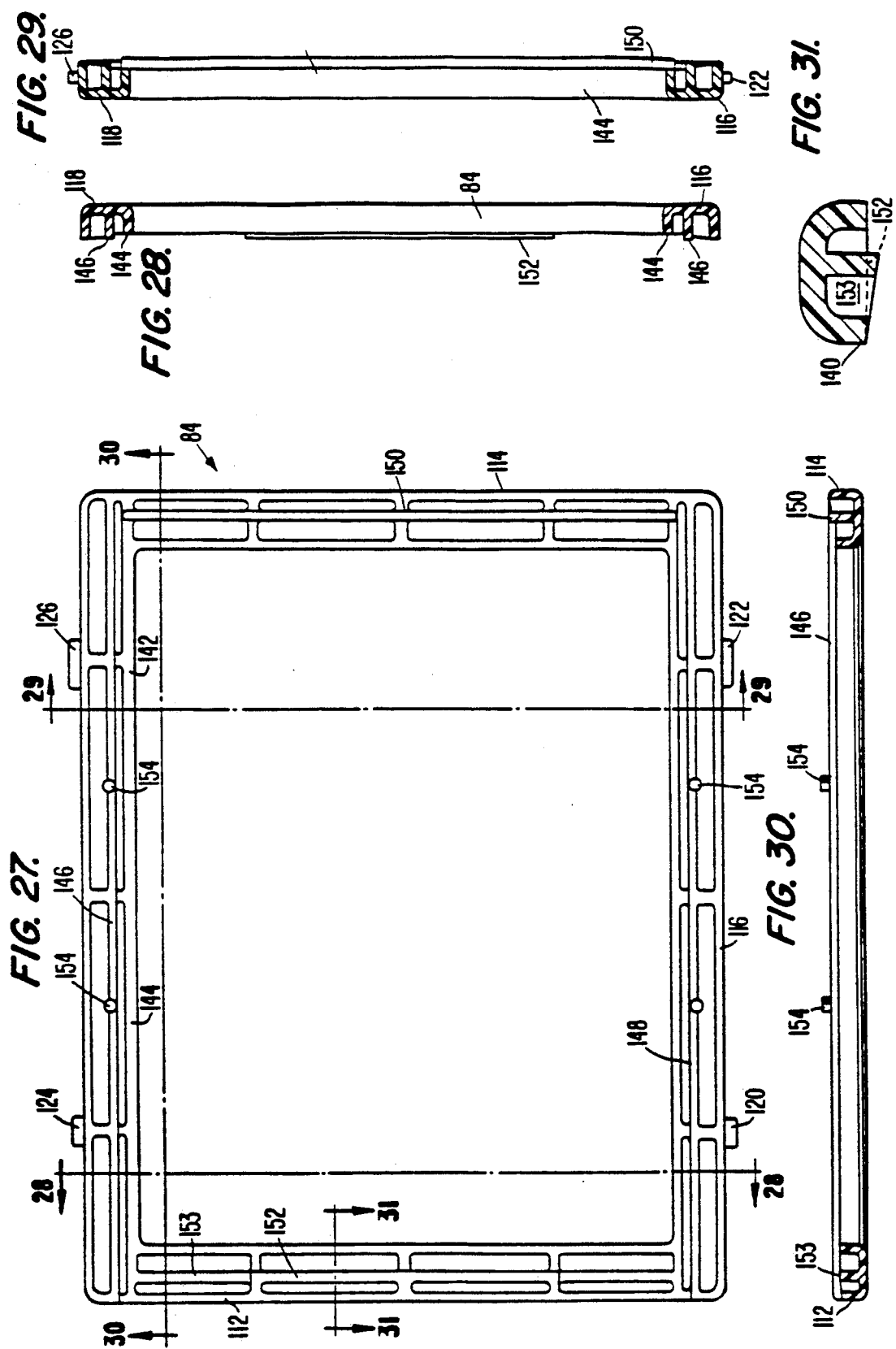

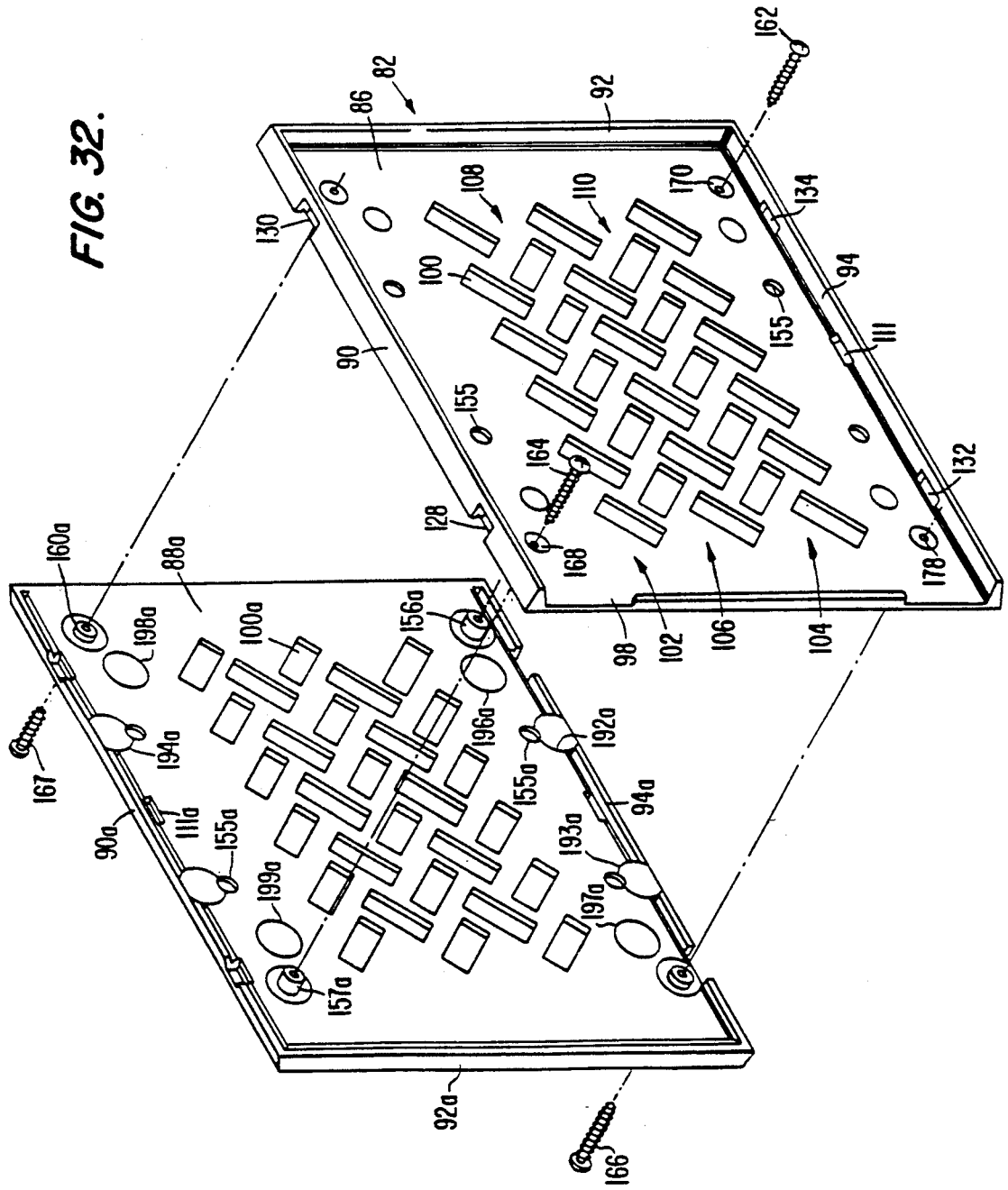

BASKET WALL AND PLACARD DISPLAY ASSEMBLY

BACKGROUND OF THE INVENTION

This is a divisional of (1) copending application Ser. No. 07/636,014, filed Jan. 4, 1991, which is a continuation of application Ser. No. 07/333,680 ('680), filed Apr. 6, 1989, now abandoned, which in turn is a continuation-in-part (CIP) of application Ser. No. 07/190,065 ('065), filed May 4, 1988, which issued May 8, 1990, as U.S. Pat. No. 4,922,639, (2) copending application 07/579,052, filed Sep. 7, 1990, which is divisional of the '680 application, and (3) copending application Ser. No. 07/533,144, filed Jun. 6, 1990, which is a CIP of the '680 and '065 applications. The entire contents of each of these applications are hereby incorporated by reference.

The present invention relates to carts used in supermarkets and other retail stores. It is further directed to advertising panels which are to be retrofitted on existing shopping carts.

Carts having a frame and a basket used in supermarkets are commonplace. The shopping cart typically has a metal cart frame on which wheels are mounted. A basket is mounted on the cart frame and includes two side walls, a front wall, a back wall, and a bottom portion. The basket may be made from wires welded together to form a gridlike construction. Alternatively, the basket may be molded from plastic. The carts may be formed in various configurations including the standard configuration (see U.S. Pat. No. 3,999,774), jumbo or minicarts, over-the-counter carts (see U.S. Pat. No. 4,273,346) and scanner carts (see U.S. Pat. No. 4,650,199). These patents are all directed to carts having plastic baskets. Regardless of the type of cart and whether the basket is made from plastic or wire, the basket is formed almost entirely of an open latticework construction.

The practice of fastening framed advertising panels to shopping carts is becoming widespread and can be a very effective advertising technique. Advertising panels are typically fastened to the outside and inside of the front wall of the shopping cart basket. These panels are used with either wire or plastic baskets. The advertising panels allow easy handling of the advertisement. With existing carts, only retrofitted framed advertising panels may be disposed on the carts. Also, panels may be disposed only on the front walls of the cart baskets because panels disposed on the side walls would prevent nesting of carts and would be damaged when attempting to nest carts together.

One known technique for retrofitting advertising panels onto shopping cart baskets is that of Actmedia Inc, wherein two separate advertising panels are mounted on either side of the front wall of the basket. The panels are attached to each other through the latticework of the front basket wall placing screws through holes in both advertising panels. Each advertising panel is formed of one piece of plastic and includes two elements, namely, a plate and a frame. The plate is rectangular and serves as the backing for the advertisement. The frame is also rectangular and is hingedly formed on the plate. The frame has tabs disposed on its top and side members which fit behind ridges disposed on the top and side peripheral walls of the plate. When the frame is snapped into the plate, the front surfaces of the frame are substantially flush with the protruding edges of the peripheral top, right and left walls of the plate.

However, this apparatus has many disadvantages. First, the frame must be hinged away from the plate to insert and remove advertisements. Additionally, the plastic hinges connecting the frame to the plate often deteriorate and break within a short time. This requires the replacement of the entire advertising panel. Because the frames are integrally formed as one piece with the plates, when the hinge or other components break, the entire panel must be replaced. Moreover, these advertising panels are formed with solid plates by injection molding plastic. As the plates cool, the plastic shrinks, causing the plate to warp. This occurs because the inner portion of the plate cools at a slower rate than the outer portion. Because high density polyethylene shrinks at least 0.20" per inch during cooling, a typical advertising panel would be 3/16 inch smaller after cooling. Slower cooling causes greater shrinkage. However, more rapid cooling on one side of the panel than on the other side causes stresses which further result in an inwardly concaving surface. The advertisement is less securely held within the panel when abutting a curved surface rather than a flat surface. This also detracts from the effectiveness of the advertisement as the concavity causes the advertisement to bow or reflect light and thereby be less readable.

SUMMARY OF THE INVENTION

An improved advertising panel for retrofitting on existing cart baskets and an advertising panel that is molded-in to plastic cart baskets are disclosed.

It is an object of the present invention to provide inexpensive, low maintenance advertising panels that use no hinges, have no moving parts and may be retrofitted on existing cart baskets.

It is another object of the present invention to provide retrofitted advertising panels having holes strategically placed in the plate element to prevent warping and stress distortion during the molding process, to allow easier placement and a flatter display without excess reflection or bowing of the advertisement, and which is easy to clean and maintain.

It is a further object of the present invention to provide a molded-in advertising frame on a cart having a plastic basket and that may be formed on the side walls of the basket without affecting the ability of the carts to nest.

It is a still further object of the present invention to provide a molded-in advertising panel that is durable, and does not have any protrusions which can catch on merchandise, fixtures or customers.

It is another object to provide a molded-in advertising panel in which advertising is visible even when carts are nested and in which the company logo is not obscured.

It is a further object to provide molded-in advertising panels using snap in frame elements that are simple to maintain and replace, that permit easy handling of the advertisement, that use no hinges or other moving parts, and that are low maintenance and inexpensive.

It is a still further object to provide advertising panels usable on the sides of shopping carts which allow the shopping carts to be nested together.

It is another object to provide a novel shopping cart design which allows the logo panel and the advertising panel thereof to be positioned on the same basket cart wall.

It is a further object to provide an improved advertising panel design which allows the advertising cards to be easily inserted into, secured within and removed from the advertising panel through a slot.

It is a still further object to provide a novel advertising panel design which can be cheaply manufactured and easily installed on shopping carts.

It is another object to provide an improved advertising panel design which prevents an advertisement display card therein from slipping downwardly or laterally out of place.

The advertising panels of the present invention are directed to achieving these objects. In one embodiments, the advertising panel is retrofitted on an existing shopping cart basket, either plastic or wire cart baskets. The advertising panel includes two separate components, namely, a frame element and a plate element. There are no moving parts and either of the two components may be separately replaced as desired. The plate element is rectangular and has outer peripheral edge walls disposed around and protruding from the perimeter of the outwardly facing side. These edge walls have tab receiving slots which receive tabs disposed on the frame element. The edge walls strengthen the plate element and prevent the frame element from receiving impacts and damage. Three edge walls—the top, the bottom and one side—are formed to shield the sides of the frame element. The remaining side serves as a receiving opening that permits insertion and removal of advertisements therethrough. This allows the top edge wall to prevent moisture from dripping down and contacting the advertisements, thereby preserving the advertisements. The receiving opening side is formed as a stepped retaining lip. This lip permits easy insertion of the advertisement into the panel while preventing tampering with and loss of the advertisement. Advertisements are easily inserted into the advertising panel through the receiving opening without removing the frame element from the plate portion. The plate element is symmetric around a central horizontal axis. It may be disposed on a cart so that advertisements can be inserted from either the left or the right side.

The plate element is formed with strategically-located oblong holes preferably having maximum widths of one-quarter inch especially when the panels are not mounted back-to-back. This dimensioning prevents objects greater than one-quarter inch in diameter from protruding therethrough and prevents children from poking and damaging the advertisement. The oblong holes prevent warping and stress distortion during the injection molding process thereby allowing a flat plate element to be constructed. This allows the advertisement to easily slide in the panel and permits a superior, flatter display without excess reflection or bowing of the advertisement. These holes also increase the cleanliness of the panel by permitting water drainage. In addition to the tab receiving slots, drainage holes are provided at the intersection of the plate element and the bottom edge wall.

The advertising panels are retrofitted on the front wall of the cart basket. Preferably, two advertising panels are used, one on the inside and one on the outside of the basket front wall. Two plate elements are disposed back-to-back with the front wall of the basket therebetween. The plate elements are screw fastened together through the front wall of the basket to secure the advertising panel to the basket. Holes are formed in projections in corresponding locations on the back of both plate elements. This permits the plate elements to more closely fit within the latticework of the front wall of the basket to better secure the advertising panels to the front wall. The frame element is rectangular, symmetrical around a central horizontal axis, and corresponds in size to the plate element. The frame element fits within the edge walls of the plate element and is secured to the plate element by complementary tabs which fit within the tab receiving slots of the edge walls of the plate element.

The molded-in advertising panel is similar in many respects to the retrofitted advertising panel and similarly uses two components—a frame element and a plate portion. The plate portion is, however, integrally molded with the side walls of the plastic basket. The plate portion can be formed on both of the side walls in addition to the front wall. This embodiment also uses no moving parts and uses a frame element that is identical to that of the retrofitted device. The frame element is rectangular, has tabs, and is replaceable and removable from the shopping cart. Preferably, the molded-in plate portions are formed near the upper rear of the side walls to be visible when carts are nested and to provide adequate space for the company logo. The plate portion is recessed into the outer surface of the basket wall and flush with the inner surface of the basket wall. When the frame element is disposed against the plate portion, the frame element is likewise recessed from the outer surface of the basket wall. The tabs in the frame element fit within tab receiving slots formed within the latticework of the basket walls which forms the outer peripheral edge walls of the plate portion. The top edge wall prevents moisture from dripping down and contacting the advertisements. Drainage holes disposed in the bottom edge wall permit water to drain. The plate portion is also formed with oblong holes which perform the same functions as the oblong holes of the retrofitted advertising panel. Advertisements are inserted and removed through the side of the panel. A series of horizontal ribs is disposed along the length of this side opening. The horizontal ribs permit easy insertion of the advertisement into the panel while preventing tampering with and loss of the advertisement.

The molded-in advertising panels have many advantages over the retrofitted version. With the molded-in panels, advertising panels may be placed on the side walls of the cart basket in addition to the front wall. Since the panel is molded into the basket walls and the frame element is recessed into the outside walls of the basket, the carts can be nested together without damaging the panels. The cost of the molded-in advertising panel is much less than that for a retrofitted panel because the plate portion is part of the cart. Placing panels on the side walls of the basket doubles the advertising capacity of each cart. Advertisements can be inserted or removed from the advertising panels without removing the frame element. This reduces the time needed to change advertisements, which can be significant as advertisements are typically changed every four weeks. Also, because the plate element is not removable, it is less likely to be damaged.

In other words, disclosed herein for walls of shopping cart baskets are advertising panels which include a plate element and a frame element which fits on the plate element and is releasably held in place thereon by a tab-and-slot arrangement. When held in place, a slot and a card display area which is encircled by the frame element are formed between the plate and frame elements. An advertisement display card can then be easily slid into and out of the display area through this slot. Projections on at least one of the elements keep the card from falling out of place when in the area. Retrofitted and molded-in panel versions are disclosed herein. Plate elements of the retrofitted version can be secured together on the inside and outside of the basket wall providing inwardly and outwardly disposed display areas. For the molded-in version the molded-in panel has its plate element molded with and recessed in from the outer surface of a wall of the plastic cart basket, and thus when positioned centrally on a basket side wall with the frame element held thereon, the panel does not prevent the carts from nesting. The frame element of the molded-in version, however, is preferably identical to that of the retrofitted version and is also releasably retained in position using tabs and slots. The frame and plate elements are both symmetrical about their longitudinal axes.

Various additional advantages and features of novelty which characterize the invention are further pointed out in the claims that follow. However for a better understanding of the invention and its advantages, reference should be made to the accompanying drawings and descriptive matter which illustrate and describe preferred embodiments of the invention.

BRIEF DESCRIPTION OF THE DRAWINGS

FIG. 22 is a side view of a conventional cart with molded-in advertising panels of the present invention.

FIG. 24 illustrates plate and frame members in exploded relation of another advertising panel embodiment of the present invention.

FIG. 25 illustrates the plate and frame members of FIG. 24 in their held together position and with an advertisement card shown being inserted thereinto (or removed therefrom).

FIG. 26 is a rear perspective view of the snap-held together plate and frame members of FIG. 25.

FIG. 27 is a rear elevational view of the frame member of the embodiment of FIG. 24.

FIG. 28 is a sectional view taken along line 28—28 of FIG. 27.

FIG. 29 is a sectional view taken along line 29—29 of FIG. 27.

FIG. 30 is a sectional view taken along line 30—30 of FIG. 27.

FIG. 31 is an enlarged sectional view taken along line 31—31 of FIG. 27.

FIG. 32 is an exploded perspective view of two plate members of the embodiment of FIG. 24.

DETAILED DESCRIPTION OF PREFERRED EMBODIMENTS OF THE INVENTION

Figure 1:
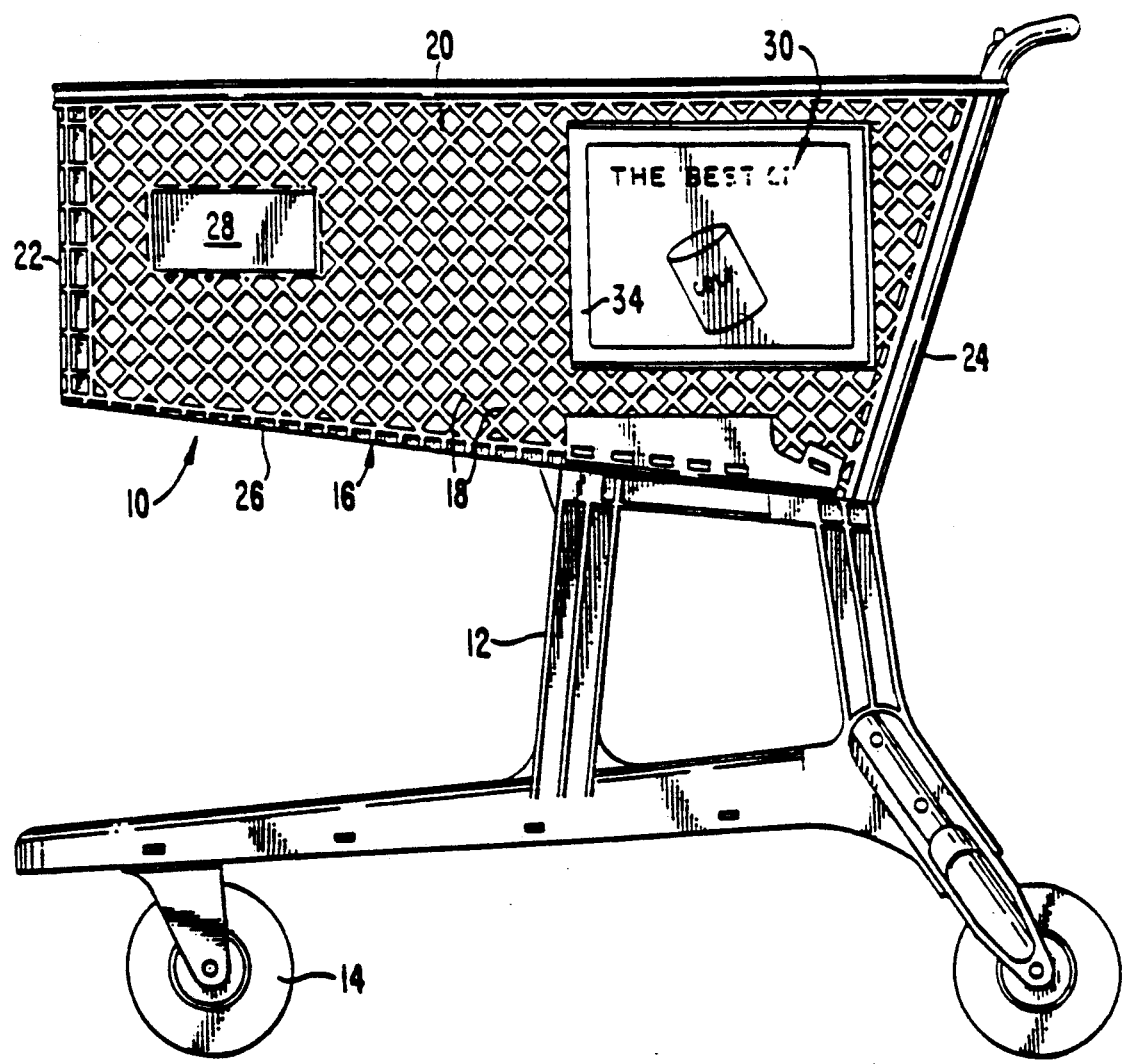
FIG. 1 is a side view of a scanner cart with molded-in advertising panels of the present invention.
Figure 2:
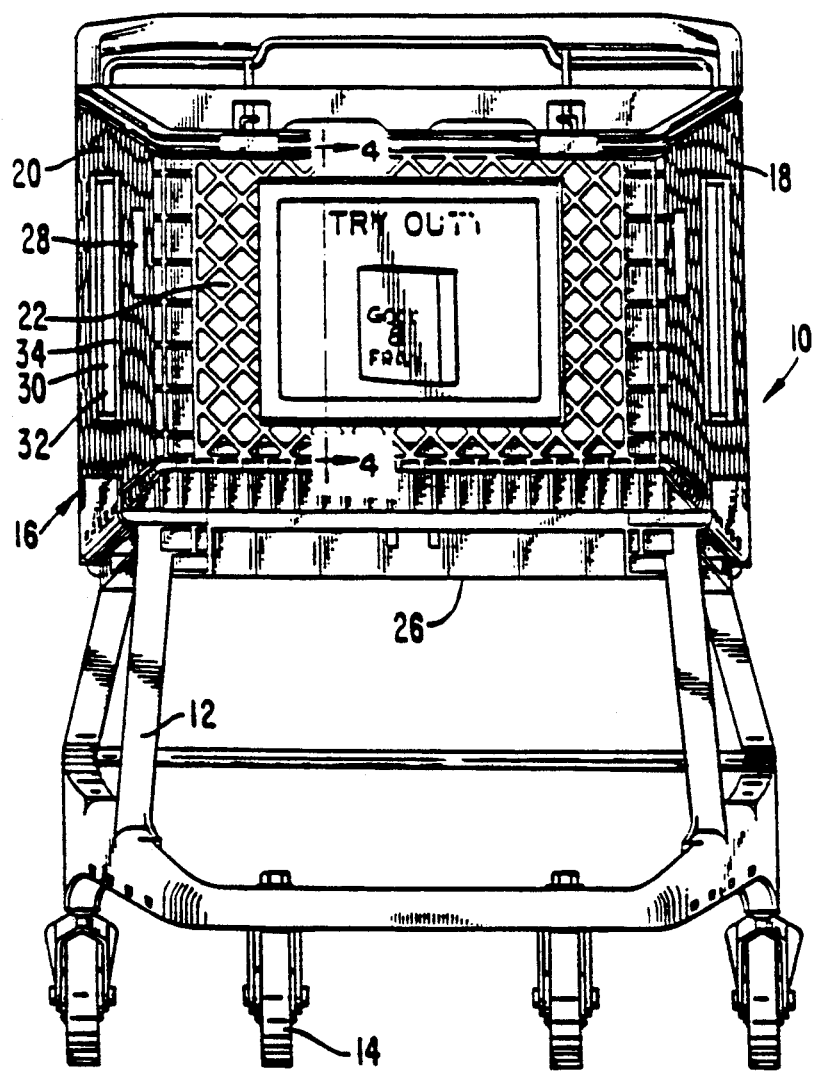
FIG. 2 is a front view of a scanner cart with retrofitted advertising panels mounted on the front wall and molded-in advertising panels on the side walls.

FIGS. 1 and 2 show a scanner type shopping cart having both retrofitted and molded-in advertising panels. Shopping cart 10 has metal cart frame 12 on which wheels 14 are mounted. Plastic basket 16 is mounted on frame 12. Plastic basket 16 can be formed of latticework 18 having any known pattern such as square or diamond. The basket can alternatively be a conventional wire mesh basket. Plastic basket 16 includes two side walls 20, front wall 22, back wall 24 and bottom surface 26. A logo space 28 is formed on one or both side walls 20.

Figure 3:
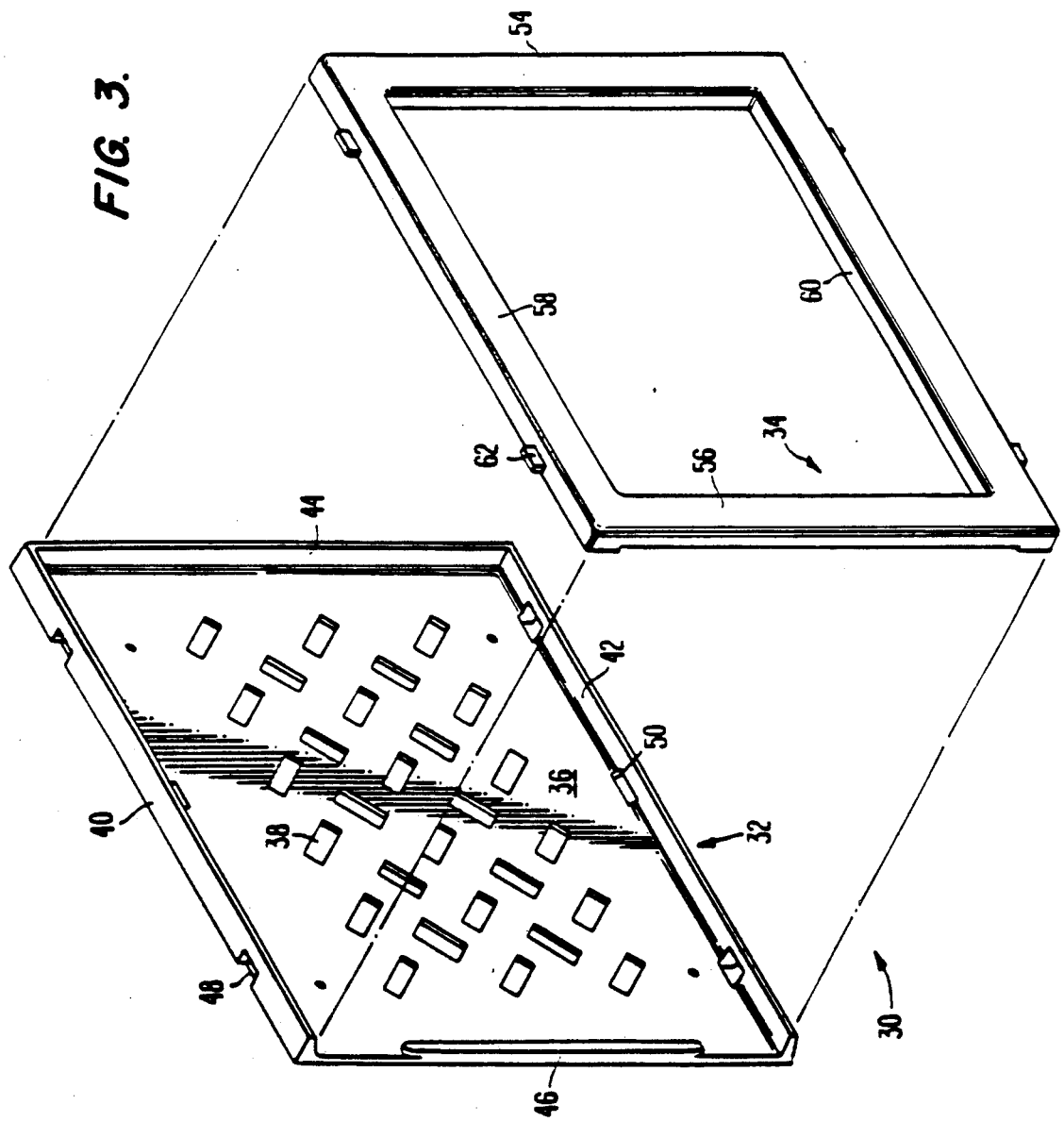
FIG. 3 is an exploded perspective view of the retrofitted advertising panel.
Figure 4:
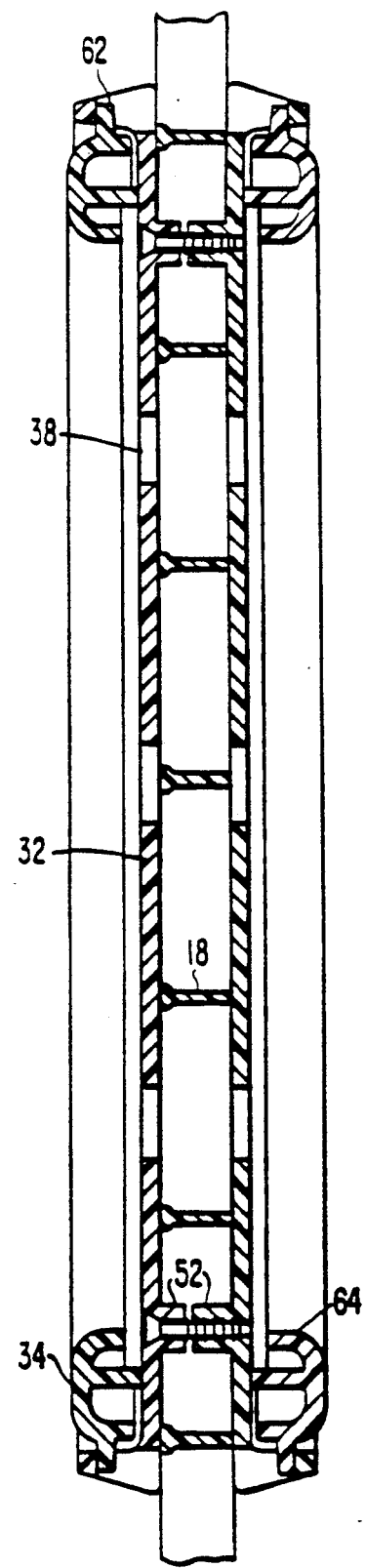
FIG. 4 is a sectional view of the retrofitted advertising panels of FIG. 2 taken along line 4—4.
Figure 5:
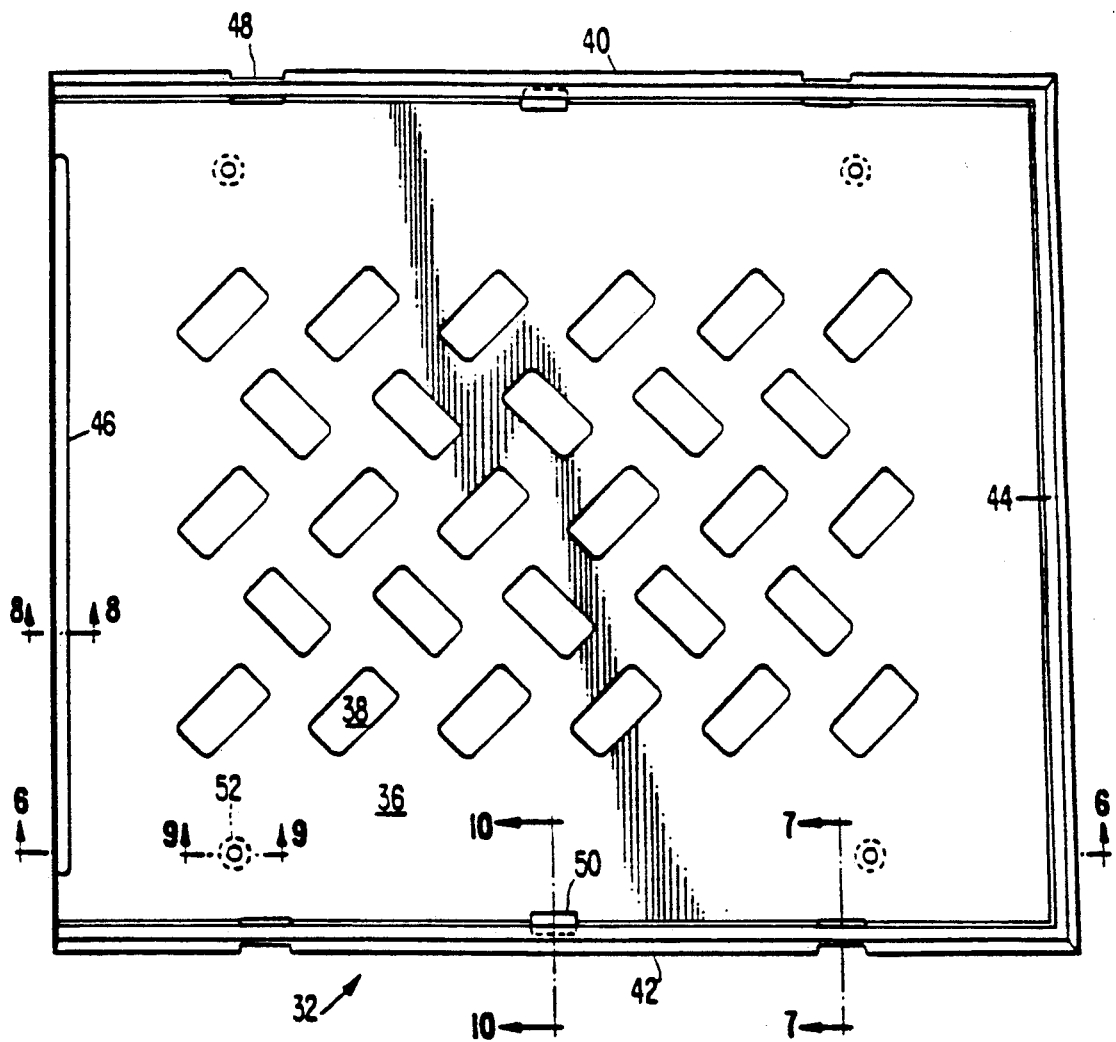
FIG. 5 is a front view of the plate element of the retrofitted advertising panel of FIG. 3.
Figure 6:
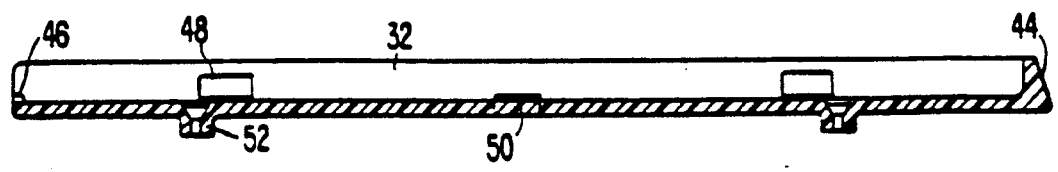
FIG. 6 is a sectional view of the plate element of FIG. 5 taken along line 6—6.
Figure 7:
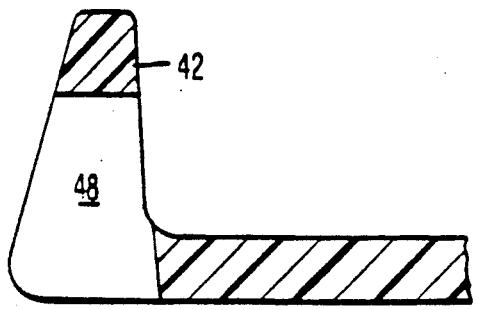
FIG. 7 is a sectional view of the plate element of FIG. 5 taken along line 7—7.
Figure 8:
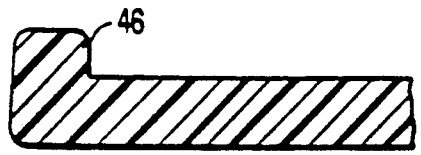
FIG. 8 is a sectional view of the plate element of FIG. 5 taken along line 8—8.
Figure 9:
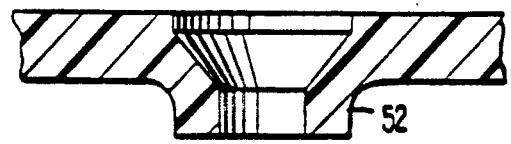
FIG. 9 is a sectional view of the plate element of FIG. 5 taken along line 9—9.
Figure 10:
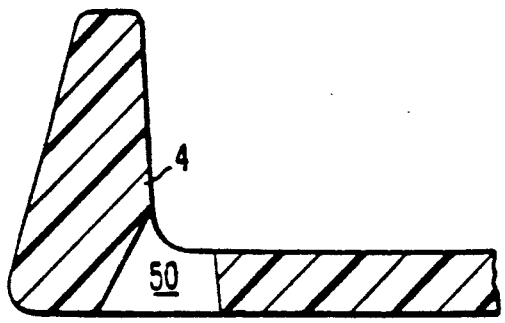
FIG. 10 is a sectional view of the plate element of FIG. 5 taken along line 10—10.
Figure 11:
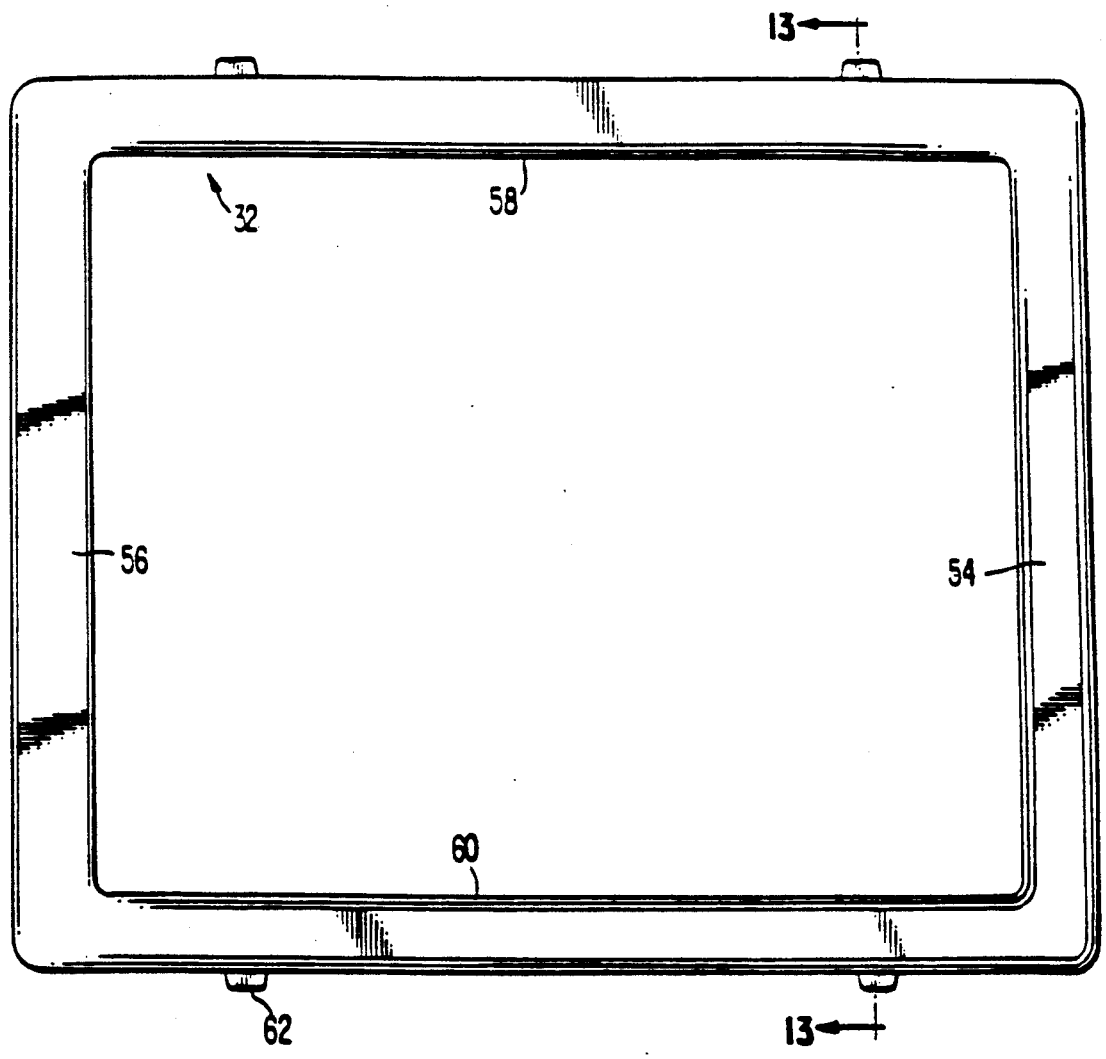
FIG. 11 is a front view of the frame element of the retrofitted advertising panel of FIG. 3.
Figure 12:
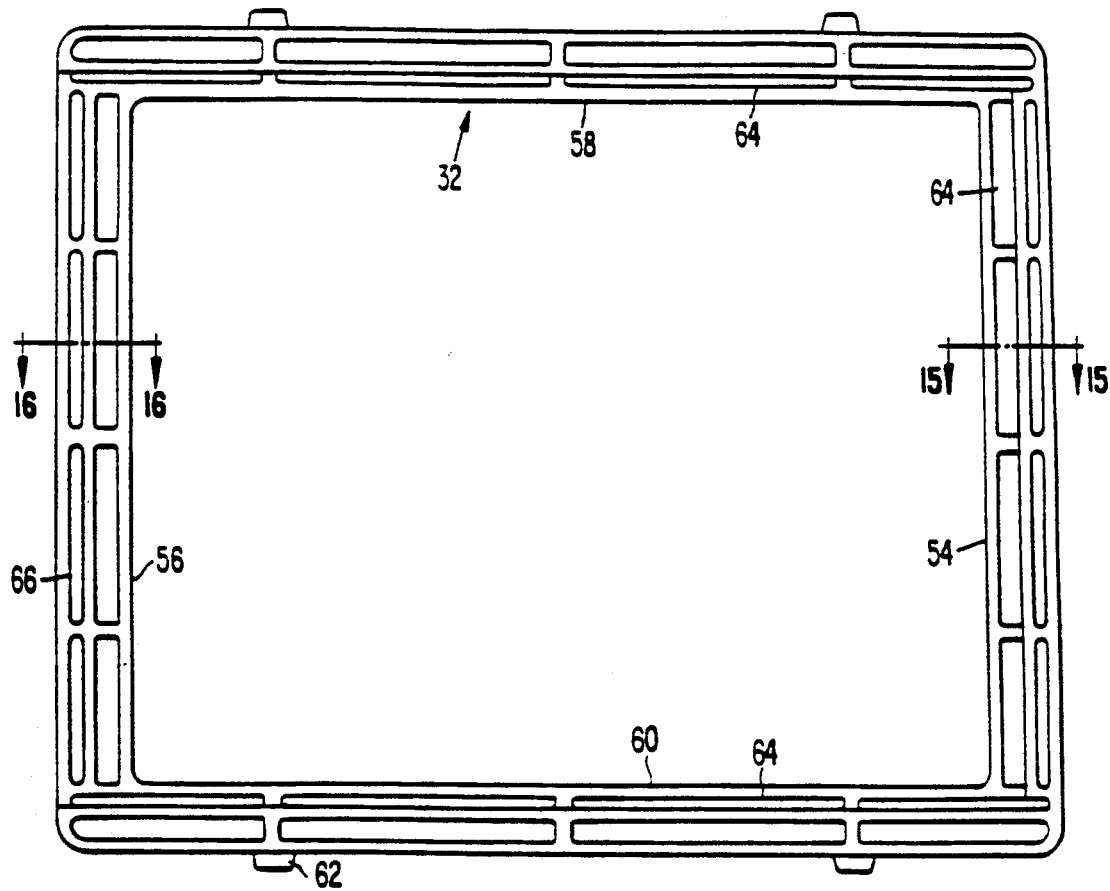
FIG. 12 is a rear view of the frame element of FIG. 11.
Figure 13:
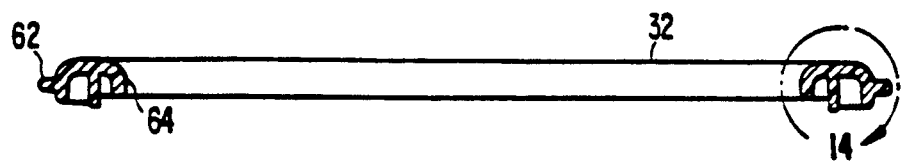
FIG. 13 is a sectional view of the frame element of FIG. 11 taken along line 13—13.
Figure 14:
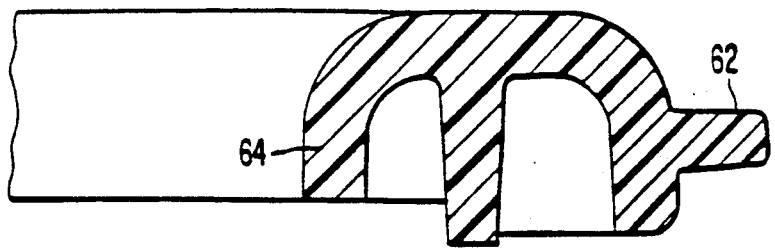
FIG. 14 is an enlarged view of the frame element of FIG. 13 taken on circle 14.
Figure 15:
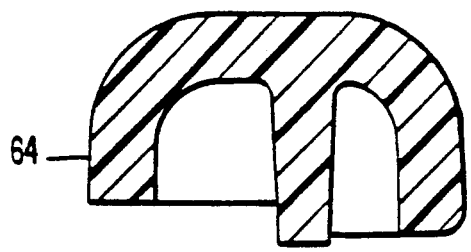
FIG. 15 is a sectional view of the frame element of FIG. 12 taken along line 15—15.
Figure 16:
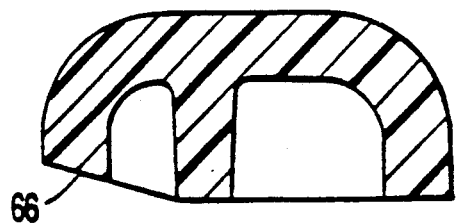
FIG. 16 is a sectional view of the frame element of FIG. 12 taken along line 16—16.
Figure 17:
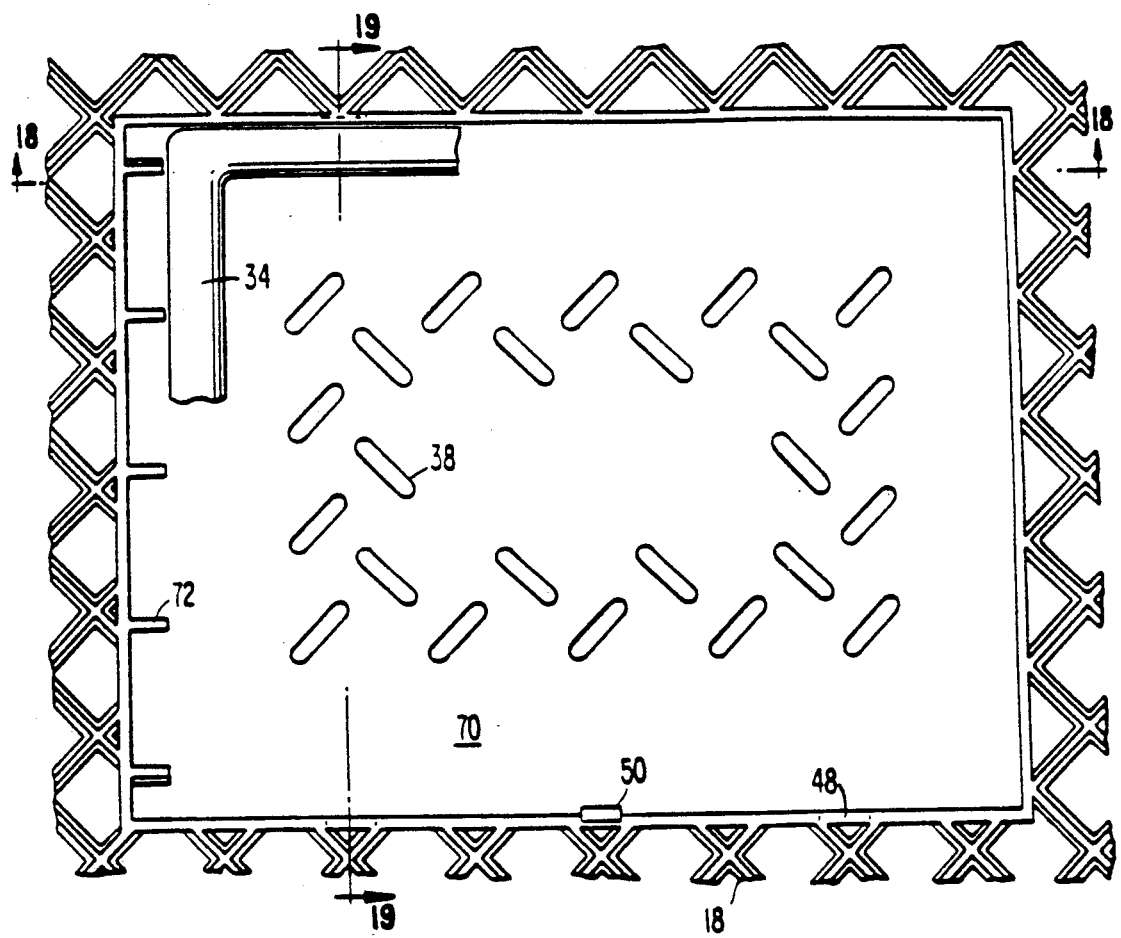
FIG. 17 is a front view of a molded-in advertising panel of the present invention showing the plate portion and a partial view of the frame element.
Figure 18:
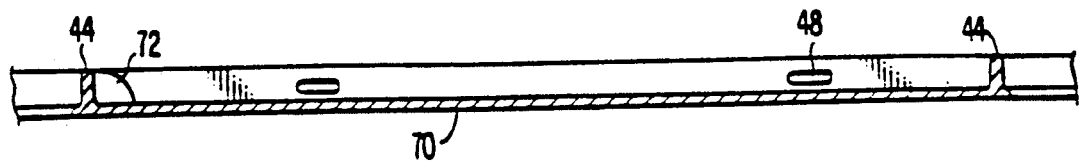
FIG. 18 is a sectional view of the plate portion of FIG. 17 taken along line 18—18.
Figure 19:
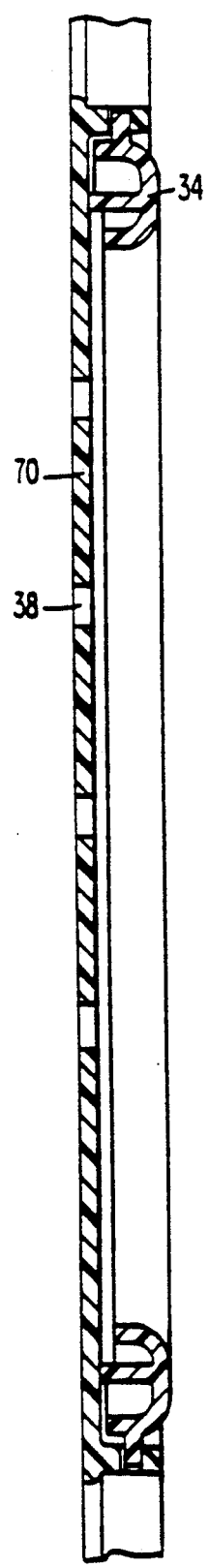
FIG. 19 is a sectional view of the advertising panel of FIG. 17 including the frame element taken along line 19—19.

Retrofitted advertising panel 30 is shown mounted on front wall 22 of basket 16 of shopping cart 10 in FIGS. 2 and 4. Although shown on a plastic scanner shopping cart basket in FIG. 2, retrofitted advertising panels 30 can be mounted on regular, jumbo, mini, and over-the-counter plastic shopping carts also. Additionally, retrofitted advertising panels 30 can be mounted on almost any wire shopping cart basket. Retrofitted advertising panel 30 includes two separate components—a plate element 32 and a frame element 34, as best shown in FIG. 3. Plate element 32, illustrated in detail in FIGS. 5-10, includes rectangular plate 36 made of polyethylene. Plate 36 is formed with a series of apertures, such as oblong holes 38, therethrough. In practice, holes 38 need not be oblong nor disposed in any particular pattern. They also need not cover the entire central region of plate 36. The holes 38 are formed to prevent warping and stress distortion of plate element 32 during the cooling phase of the molding process. The holes 38 are formed preferably in the central portion of plate element 32 and are located so that there are no extended continuous areas of uninterrupted plastic. The holes 38 can be arranged so that most line segments taken from one side of plate 36 to another side and passing through the central region of plate 36 intersect at least one hole 38.

Plate element 32 is formed with edge walls extending around the perimeter and projecting outwardly from the front of plate 36. Top edge wall 40, bottom edge wall 42 and side edge wall 44 are disposed along the entire length of three edges of plate 36. Edge walls 40, 42, 44 are formed with a five degree taper. This assists in the removal of plate element 32 from the mold during molding and creates a more streamlined, integral look for the advertising panel. Edge walls 40, 42, 44 surround frame element 34 along three sides. The edge walls strengthen plate element 32 and shield the sides of frame element 34. Top edge wall 40 greatly reduces the possibility of moisture dripping onto and damaging the advertisement. The remaining side of plate element 32 serves as the advertisement receiving slot or opening through which advertisements are inserted and removed. Stepped retaining lip 46 is disposed along the majority of this side of plate 36.

Two tab receiving openings 48 are formed in each of top and bottom edge walls 40, 42 and hold frame element 34 in place on plate element 32. Tab receiving openings are formed totally through top and bottom edge walls 40, 42. Additionally, a centrally located drainage hole 50 is disposed along both the top and bottom edges of plate 36. Drainage holes 50 are formed through only the edge of plate 36 at the intersection of edge walls 40, 42. Drainage holes 50 do not extend through and do not provide vertical openings through edge walls 40, 42. Drainage holes 50 permit moisture that enters advertising panel 30 to drain out of the panel. The placement of drainage hole 50 adjacent top edge wall 40 renders plate element 32 symmetrical around its central horizontal axis. Thus, plate element 32 may be used with the advertising receiving opening on its right or left side. If symmetry is not required, then drainage hole 50 disposed adjacent top edge wall 40 need not be formed.

Hollow mounting projections 52 are formed on the back surface of plate element 32 and receive self-tapping screws which secure advertising panels 30 to front wall 22 of shopping cart 10. In practice, two advertising panels 30 are disposed on front wall 22. One panel is disposed in the outside and the other on the inside of front wall 22. Thus, the back surface of plate elements 32 abut each other through front wall 22 and mounting projections 52 on each plate element 32 abut each other. Screws are threaded from one plate element 32, through front wall 22, and into the other plate element 32.

Frame element 34, which is illustrated in detail in FIGS. 11-16, includes first and second side members 54, 56, top member 58, and bottom member 60 (i.e. peripheral members) all connected to leave a central open viewing area. Frame element 34 is symmetrical around a central horizontal axis. Tabs 62 are disposed on the side of top and bottom members 58, 60 at locations corresponding to tab receiving openings 48 of plate element 32. Tabs 62 removably fit into tab receiving openings 48 to secure frame element 34 to plate element 32. Frame element 34 fits within edge walls 40, 42, 44. The undersides of top member 58, bottom member 60 and first side member 54 are formed with shortened inside portions 64 to receive advertisements thereunder. This secures the advertisements in advertising panel 30. The depth of second side member 56 is less than that of top, bottom, and first side members 58, 60, 54. The outside portion of the underside of second side member 56 is sloped or tapered upwardly in a direction extending outwardly. This sloped surface 66 facilitates insertion and removal of advertisements between plate element 32 and frame element 34. Thus, frame element 34 need not be removed or dislodged from plate element 32 to insert or remove advertisements.

Figure 21:
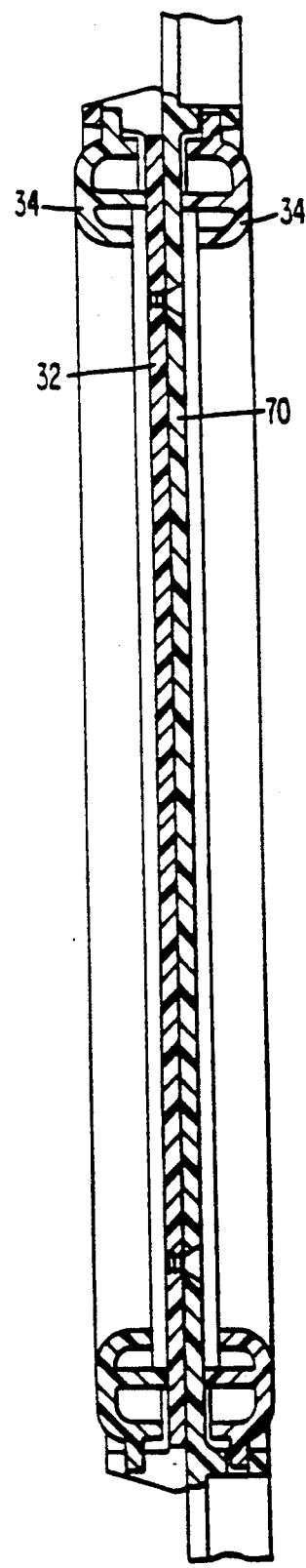
FIG. 21 is a sectional view of the advertising panels of FIG. 20 taken along line 21—21.
Figure 20:
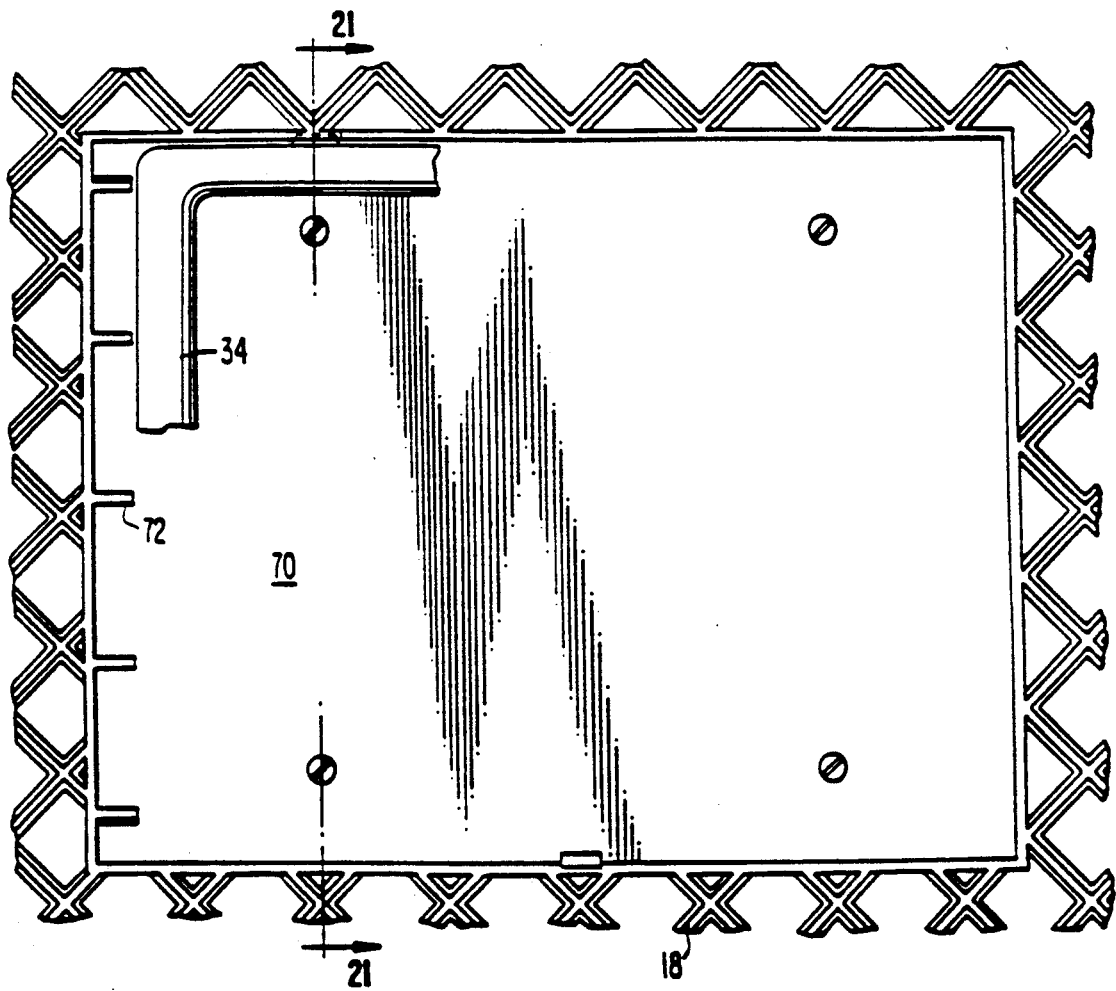
FIG. 20 is a front view of a molded-in advertising panel with a retrofitted advertising panel mounted thereon.
Figure 23:
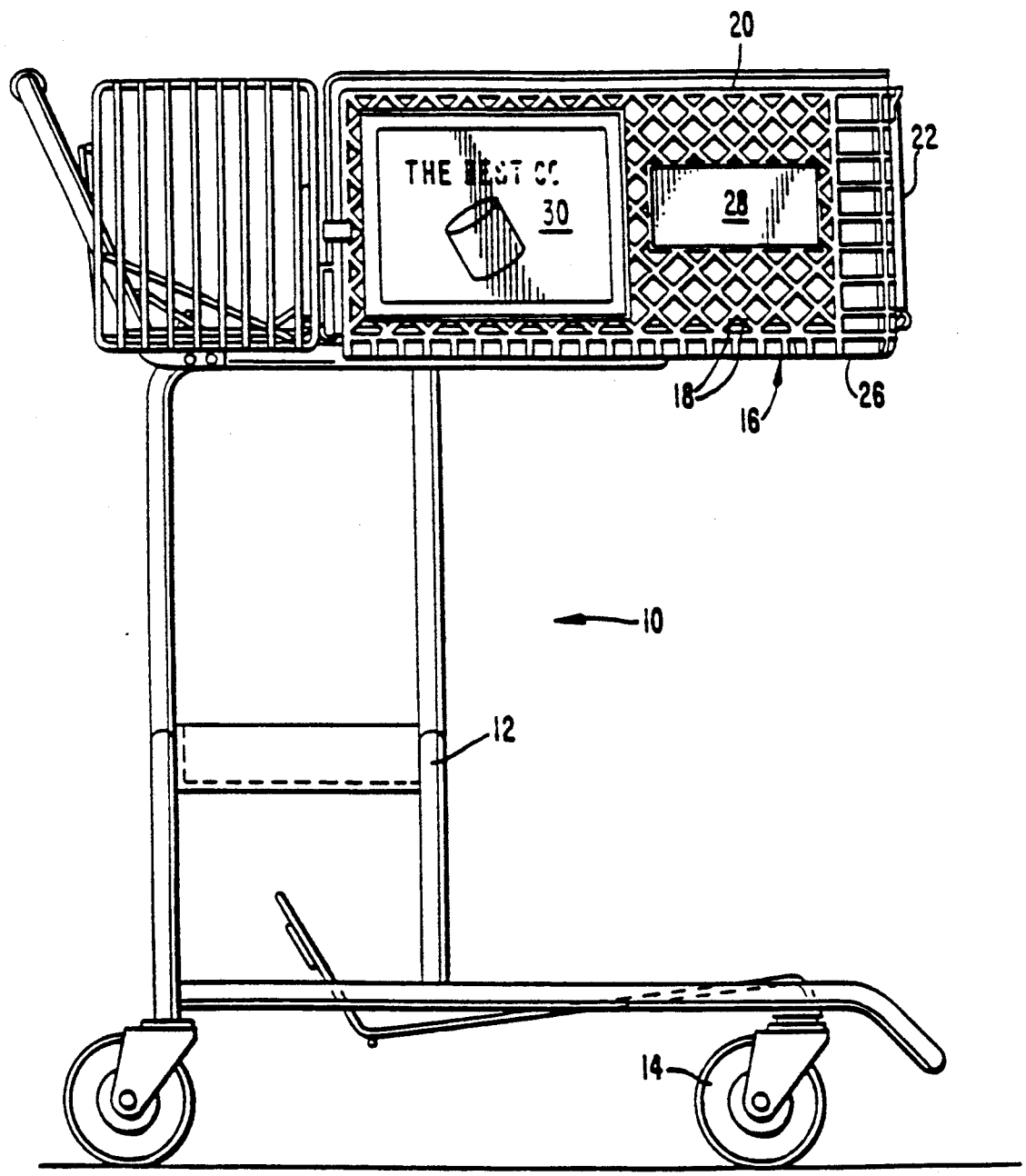
FIG. 23 is a side view of an over-the-counter cart with molded-in advertising panels of the present invention.

FIGS. 1 and 2, 22, and 23 illustrate scanner, regular and over-the-counter shopping carts, respectively, having molded-in advertising panels 30. Molded-in advertising panels 30 are formed not only on the exterior of front wall 22 of shopping carts 10, but also on both side walls 20. Additionally, a retrofitted advertising panel 30 may be fastened to the inside of front wall 22, as shown in FIGS. 20 and 21. In FIGS. 20 and 21, the oblong holes 38 are omitted for clarity. When mounting a retrofitted advertising panel on to a molded-in advertising panel, mounting projections are not necessary. Alternatively, molded-in advertising panel 30 may be formed on the inside of front wall 22 and retrofitted advertising panel 30 fastened to the outside of front wall 22, or molded-in advertising panels 30 may be formed on both sides of front wall 22. Frame element 34 used with molded-in advertising panel 30 is identical to frame element 34 used with retrofitted advertising panel 30. Plate portion 70 performs identical functions to plate element 32 of the retrofitted advertising panel but, because it is molded and formed as part of the walls of basket 16, it has different features.

Plate portion 70, shown in detail in FIGS. 17-21, is integrally formed with walls 20, 22 of plastic basket 16. (For this discussion, it is assumed that plate portion 70 is formed to display advertisements on the outside of front wall 22 only.) The rear or inwardly facing surface of plate portion 70 is formed flush with the inner surface of walls 20, 22. The front or outwardly facing surface of plate portion 70 is recessed from the outer surface of walls 20, 22. For convenience, the inner and outer surfaces of walls 20 and 22, excluding plate portion 70 and edge walls 40, 42 and 44, may be referred to as surface planes to denote the outer limits or boundaries of the wall surfaces, irrespective of the actual wall construction or wall geometry. When frame element 34 is positioned on plate portion 70, it too is recessed from the outer surface of walls 20, 22. Plate portion 70 is formed on the upper rear portion of side walls 20, and logo space 28 is formed toward the front of side walls 20. This permits advertisements within advertising panel 30 to be visible even when the shopping carts 10 are nested. Plate portion 70 is also formed with a series of apertures such as oblong holes 38. Because, regarding at least advertising panels 30 molded in side walls 20, oblong holes 38 will be exposed to the interior of basket 16, they are formed preferably with a maximum width of only 0.25 inch. This minimizes the number of objects that can extend through oblong holes 38 to damage the advertisement. It also prevents children from poking their fingers in through the holes and tampering with the advertisement. The top, bottom and side peripheral edge walls 40, 42, 44 for plate portion 70 are formed by latticework 18 adjacent and surrounding plate portion 70. Retaining mean including retainers or tab receiving openings 48 are formed in appropriate locations in top and bottom edge walls 40, 42. A central drainage hole 50 is formed in bottom edge wall 42 only. Although edge walls are formed around the entire perimeter of molded-in advertising panel 30, additional horizontal ribs 72 are formed on plate portion 70 adjacent the side of the plate portion that serves as the advertisement receiving opening.

FIGS. 24-32 illustrate generally at 80 an alternative, preferred retrofit advertising panel assembly of the present invention. As will be apparent to one skilled in the art, many of the novel features therein can be readily adapted to a molded-in design. The advertising panel assembly 80, as shown for example in FIG. 24, generally includes a plate element or member 82 and a frame element or member 84. Although this assembly design embodies the general concepts of some of the previously-described designs, there are a number of improved differences.

The plate member 82 has a front side 86, a rear side 88, peripheral walls 90, 92, 94 along three sides, and a stepped retaining lip 96 positioned at the fourth side 98. The front side 86 is a rectangular flat plate element having a plurality of rows of oblong holes 100. As pictured there are five alternating rows wherein the outer and center rows 102, 104, 106 each have six oblong shaped holes and the middle two rows 108, 110 each have five oblong holes. These holes 100 assist in the cooling formation of the plate member 82, as was previously discussed. Central drainage holes 111 are also provided.

The frame member 84 is formed by a pair of side frame elements 112, 114, a "top" frame element 116 and a "bottom" frame element 118. Tabs 120, 122, 124, 126 project perpendicularly out from the "top" and "bottom" frame elements 116, 118, are integrally molded therewith and are adapted to fit into corresponding slots 128, 130, 132, 134, respectively, in the top and bottom walls 90, 94 of the plate member 82. The tabs 122, 126 furthest from the fourth side 98 (the side of the stepped retaining lip 96) are wider than the closer tabs 120, 124. This aids in the snap fit of the members and the manipulation of the advertising display card (see FIG. 25). The tabs of the frame member 84 easily snap into and out of the corresponding slots in the plate member 82 to releasably secure the frame member to the plate member. When the frame and plate members 84, 82 are snapped together in a "held" position, as best shown in FIGS. 25 and 26, an advertising card receiving slot 136 is defined along an end thereof (the fourth side 98) at the stepped retaining lip 96. An advertising card, as shown at 138 in FIG. 25, can then be easily slid into and through the advertising card receiving slot 136 into an advertising card display area disposed between the plate and frame members 82, 84 and encircled (or framed) by the frame elements 112, 114, 116, 118 of the frame member 84.

An alternative design positions or forms the tabs on inner edges of the plate member and the corresponding openings or slots on outer edges of the frame member. This design is much better suited, however, for the retrofit version than the molded-in version.

The advertising card 138 has length and width dimensions slightly greater than the framed opening shown generally at 140 defined by the frame member 84 so to be retained therein. More particularly, the backside of the frame member 84, as shown in FIGS. 27-31, includes an inner framing portion 142 around the circumference of the opening 140 and having its surface recessed out from the plate member 82 when in the held position. This framing portion 142 is defined by an inner rib 144 extending around the opening 140. Raised or rearwardly extending frame portions 146, 148, 150 then extend around the top, the bottom and the side, respectively, of the frame member 84 and block the advertising card 138 (FIG. 25) from sliding out of the advertising card display position in a direction other than that of the slot 136. The card 138 cannot freely slide out of the remaining side 98 because of the stepped retaining lip 96 and the central stepped portion 152 of the elongated strip 153 which is shown in FIGS. 28 and 31.

Referring to FIG. 26, the rear side 88 of the plate member 82 has four hollow rearwardly extending projections 156, 157, 158, 160 positioned generally at each of the four corners thereof. Preformed holes extend through these projections and through the front side 86 of the plate member. Screws, such as flat-tipped machine screws 162, 164, 166, 167, can be screwed in through these openings when two similar plate members 82 and 82a (elements for plate member 82a which are similar to those of plate member 82 have the same reference numeral followed by an "a") are aligned in back-to-back relation as shown in FIG. 32. According to this design the projections 156, 158 (and 156a and 158a) of the plate member 82 (and 82a) which receive the ends of the screws are longer than those through which the screws are initially screwed to ensure a good holding grip to the opposite or held plate member. Thus, the longer projections provide additional screw threads in the member to be attached for relative secure attachment. Similarly, recesses 168, 170 are provided in the front side 86 of the plate member 82 diagonally positioned for receiving therein the heads of the screws 164, 162. Only small holes 176, 178 are formed at the other two corners for receiving the pointed tips of the screws 167, 166 passing from the opposite plate member 82a. The plate members 82 and 82a thereby can be secured to one another and on opposite sides of a wall of a shopping cart as has been previously described (see, e.g., FIGS. 4 and 21).

Four projections 154 and four openings 155 are provided to prevent the advertisement display cards from slipping down out of the window area or framed opening 140 defined by the frame member 84. Projections 154 extend rearwardly from the middle ribs or frame portions 146 and 148, as seen in FIGS. 27 and 30. The projections 154 comprise plastic protrusions integrally formed with the frame member 84. The openings 155 are manufactured to extend through the plate member 82, as seen in FIGS. 24 and 32. The projections 154 are sufficiently long and the holes 155 matingly positioned so that the projections extend beyond the front surface of the plate member 82 and into the holes when the two members are snap-held together. This interfitting relation is best shown in FIG. 26. By this means, advertisement display cards cannot (downwardly) slip beyond the protrusions 154 and thereby remain securely in place. This protrusion/hole design can, of course, be used for both the retrofit and molded-in panel designs of this invention.

This diagonal and identical orientation of the projections 156, 157, 158, 160 allows for both of the plate members 82, 82a to be identical and merely differently oriented and facing. Also, assembly thereof is easier since the assembly personnel need not distinguish between the inside and outside plate members 82, 82a. Similarly, the frame members 84 for the inside and outside plate members are identical. The fact that identical parts can be used for both the front and the back makes the manufacture thereof cheaper since only a single mold design is required. Also, installation is easier since it is not required to ship and mate different styles of frames and plates.

As can be seen in FIGS. 26 and 31, each of the projections 156, 157, 158, 160 is surrounded by imprints or circles 184, 186, 188, 190, respectively, which correspond to a molding step. Additional pits or circular imprints are provided along the top and bottom, wherein the middle imprints 192, 193, 194, 195 engage the top and bottom edges of the plate member 82 and the outer imprints 196, 197, 198, 199 are spaced inwardly from the edges. The mold (not shown) for the plate member 82 has the capability of cutting the long steel rods thereof (not shown) to form the holes at any of these circular locations or imprints. Thus, any combination of projection holes can be readily used to accommodate different sizes of shopping carts. In other words, these additional imprints provide flexibility for changes in molding for panels for different (front) shopping cart walls.

Numerous characteristics, advantages and embodiments of the present invention(s) have been described in detail in the foregoing description with reference to the accompanying drawings. However, the disclosure is illustrative only, and the invention is not limited to the illustrated embodiments. Various changes and modifications may be effected therein by one skilled in the art without departing from the scope or spirit of the invention.

What is claimed is:

1. A basket wall and display card assembly, comprising:
    a basket wall having interior and exterior wall surface planes;
    a back plate secured to and integrally formed and molded with said basket wall so as to lie generally encircled by said basket wall to form a single piece structure said back plate having a front face, a plate perimeter and an upright edge wall around a substantial portion of said plate perimeter and extending out from said front face, said front face being recessed in a distance from said exterior wall surface plane;
    a display card frame, said back plate and said frame being manufactured as separate pieces; and
    holding means for releasably holding said frame relative to said edge wall such that said frame and said back plate are in a securely held position, and for allowing said frame and said back plate to be completely separable one from the other;
    wherein when said frame and said back plate are in the held position, a display card display area is defined generally therebetween wherein a replaceable display card can be held and viewed generally through said frame.

2. The assembly of claim 1 wherein said basket is sized for nesting with a similar basket and wherein said frame when in the held position has the outside surface thereof being generally flush with said exterior wall surface plane so as not to interfere with nesting of similar baskets.

3. The assembly of claim 1 wherein at least a portion of said frame, when in the held position, is recessed in relative to said exterior wall surface place.

4. The assembly of claim 1 wherein said basket wall is formed of a latticework construction.

5. The assembly of claim 1 wherein said wall is formed of a plastic latticework construction, said wall includes an area void of the plastic latticework material, and said back plate is secured in said void area.

6. The assembly of claim 1 wherein said back plate is rectangularly shaped, and said edge wall is formed on three of four perimeter edges of said back plate.

7. The assembly of claim 1 wherein said back plate includes a plurality of rows of plate through-holes through said front face.

8. The assembly of claim 7 wherein said back plate is molded of plastic.

9. The assembly of claim 7 wherein said through-holes are each oblong shaped.

10. The assembly of claim 1 wherein said frame includes an inwardly projecting rib structure defining at least in part said display card display area with said frame and said back plate in the held position.

11. The assembly of claim 1 wherein said frame is symmetrical about its longitudinal axis.

12. The assembly of claim 1 wherein said frame includes a frame member, and said holding means releasably holds said frame member directly to said edge wall.

13. The assembly of claim 1 wherein said display card frame includes first and second frame members, and said holding means releasably holds both said first and second frame members directly to different portions of said edge wall.

14. The assembly of claim 13 wherein said first and second frame members are spaced on opposite edges of said frame.

15. The assembly of claim 14 wherein said first frame member comprises a top frame member and said second frame member comprises a bottom frame member spaced below said top frame member.

16. The assembly of claim 15 wherein said holding means comprises at least one tab formed on said bottom frame member and at least one tab formed on said top frame member.

17. The assembly of claim 1 wherein said holding means comprises a plurality of notches in at least one said frame or said back plate and a plurality of corresponding tabs on at least the other said frame or said back plate.

18. The assembly of claim 17 wherein at least some of said notches comprises through-holes.

19. The assembly of claim 18 wherein said through-holes are in said edge wall.

20. The assembly of claim 1 wherein said holding means comprises a plurality of tabs formed on said frame and a plurality of corresponding notches formed in said back plate.

21. The assembly of claim 20 wherein said notches are formed in said edge wall.

22. The assembly of claim 20 wherein said notches comprises through-holes.

23. The assembly of claim 20 wherein said tabs project vertically out from said frame.

24. The assembly of claim 1 wherein said basket wall comprises a wheeled shopping cart basket side wall.

25. A cart as claimed in claim 24, wherein said basket sidewall includes a rear upper portion and wherein said backplate, display card frame and holding means are disposed in the upper rear portion of said basket wall.

26. The assembly of claim 1 wherein said holding means comprises a notch and tab holding assembly.

27. The assembly of claim 1 wherein said holding menas comprises a snap fastening assembly.

28. A basket wall and display card assembly, comprising:

a basket wall formed of molded plastic, said wall having interior and exterior wall surface planes;

a back plate secured to an integrally formed and molded with said basket wall and generally encircled by said basket wall, said back plate having a front face, a plate perimeter and an upright edge wall including an inner perimeter; a poriton of said basket wall disposed around a substantial portion of said plate perimeter and extending out from said front face, said front face being recessed in a distance from said exterior wall surface plane and said edge wall not extending substantially beyond said wall exterior surface plant;

a display card frame including an outer frame perimeter sbustantially corresponding in size to the inner perimeter of said edge wall;

holding means for releasably holding said frame relative to said edge wall such that said frame is securely held relative to the back plate in a held position, and for allowing said frame and back plate to be completely separable one from the other, said holding means comprising cooperating snap fitting male and female tabs and tab retainers on said edge wall and said frame perimeter;

wherein when said frame is in the held position, said tabs and tab retainers are engaged with said tabs spanning the interface between the frame perimeter and the edge wall, and a display card display area is defined generally between the frame and the back plate wherein a replaceable display card can be held and viewed generally through said frame, and at least a portion of said frame is recessed from the wall exterior surface plane.

29. A basket wall and display card assembly of claim 28 including a plurality of apertures through said back plate spaced over a substantial portion of the back plate.

30. A basket wall and display card assembly of claim 28 wherein said basket is sized for nesting with a similar basket, and wherein at least a portion of said frame is recessed within said edge wall when said frame is in the held position so as not to interfere with nesting of the basket.

31. A cart with a plastic basket of open latticework construction including at least three walls and at least one advertising panel, said advertising panel comprising a plate portion, a frame element and retaining means for holding said frame element assembled with said plate portion, said plate portion being integrally formed and molded as one piece with at least one of said walls of said basket, said one basket wall having inner and outer wall surface planes; and said frame element having outer peripheral dimensions generally corresponding to the outer peripheral dimensions of said plate portion and being removably assembled on said plate portion; wherein said advertising panel defines an advertisement display card support area between said frame element and said plate portion; wherein said plate portion includes an inner side flush with the inner wall surface plane of said basket wall, an outer side recessed from the outer wall surface plane of said basket wall and a plurality of apertures extending through a substantial area of said plate portion; and wherein at lest a portion of said frame element is recessed from said outer wall surface plane of said basket wall when said frame element is asembled on said frame portion.

32. A cart as claimed in claim 31, wherein said cart is sized for nesting front to rear with a similar cart having a similar basket and advertising panels, and wherein said at least one wall of the basket containing said plate portion and frame element assembled thereto comprises a sidewall of the basket; said advertising panel being disposed at the upper rear portion of said basket, whereby said advertising panel is exposed at least in part when the cart is nested with similar carts.

33. A cart with a plastic basket of open latticework construction including at least three walls and at least one advertising panel, said advertising panel comprising a plate portion defining a placard display area and a frame element "including peripheral members connected to leave a central open window area", said plate portion being integrally formed and molded with at least one of said walls of said basket so as to be generally encircled by said basket wall to form a single piece structure outwardly projecting edge walls extending around a periphery of said plate portion and integrally formed with said plate portion; retainer means for holding said frame element assembled with said plate portion, said retainer means including retainers in said peripheral edge walls; and said frame peripheral member having outer peripheral dimensions generally corresponding to the interior peripheral dimensions of said edge walls and being removably mounted within said edge walls, wherein said advertising panel defines an advertisement dispaly card support area beneath sid frame element when said frame element is mounted within said edge walls and wherein said retaining means comprises a plurality of first retainers disposed on the frame element and a plurality of second retainers disposed in corresponding locations in said edge walls, said first and second retainers cooperating together when said frame element is mounted in said edge walls.

34. A basket wall and display card assembly of claim 33 including a plurality of apertures through said back plate spaced over a substantial portion of the back plate.

35. A cart as claimed in claim 33, wherein said cart is sized for nesting front to rear with a similar cart having a similar basket and advertising panels, and wherein said at least one wall of the basket containing said plate portion and frame element assembled thereto comprises a sidewall of the basket; said advertising panel being disposed at the upper rear portion of said basket, whereby said advertising panel is exposed at least in part when the cart is nested with similar carts.

36. A nestable basket comprising at least one sidewall comprising latticework and including inner and outer sidewall surface planes; an advertising display panel supported in the sidewall between the inner and outer sidewall surface planes, said display panel comprising a support portion permanently attached to the sidewall and having an inner support surface not extending beyond the inner sidewall surface plane and an outer support surface recessed from the outer sidewall surface plane; a retainer means recessed from the outer sidewall surface plane for retaining an advertising placard adjacent the outer support surface of the support portion; and support portion having a peripheral boundary area and said retainer means comprises a frame member including a central open display window, said frame member substantially coextensive with at least part of the support portion peripheral boundary area.

37. A basket as claimed in claim 36, wherein said support portion constitutes an extension of said one sidewall.

38. A basket as claimed in claim 36, wherein said inner support surface of said support portion is substantially coextensive wtih said inner sidewall surface plane.

39. A basket as claimed in claim 36, including upright edge walls extending from the support portion peripheral area towards the sidewall outer surface plane, said edge walls defining a placard display area on said support portion, said retainer means disposed within said edge walls and separable from the display panel.

40. A basket as claimed in claim 39, said edge walls and retainer means including cooperating securing means for removably securing the retainer means within the edge walls.

41. A basket as claimed in claim 40, said securing means comprising a snap-fitting securing means.

42. A basket as claimed in claim 36, including an array of openings located in an area traversing the majority of said support portion.

43. A basket as claimed in claim 42, wherein said support portion constitutes an extension of said one sidewall.

44. A basket as claimed in claim 36, wherein said basket comprises a nestable shopping cart nestable front to rear with a similar cart, said sidewall is a lateral sidewall of the cart, and said display panel is disposed at an upper rear area of the sidewall, whereby the display panel is at least partially exposed when the cart is nested with another similar cart.

45. A nestable basket as claimed in claim 36, including upright edge walls extending from said support portion peripheral area toward the sidewall outer surface plane, said retainer means connected to said edge walls and including portions exending toward the central area of the support portion for defining said display window.

* * * * *